(12) United States Patent
Kim

(10) Patent No.: US 8,521,087 B2
(45) Date of Patent: Aug. 27, 2013

(54) SYSTEM AND METHOD FOR COGNITIVE RADIO TRANSMISSION

(75) Inventor: Sang Gook Kim, San Diego, CA (US)

(73) Assignee: LG Electronics Inc., Seoul (KR)

( * ) Notice: Subject to any disclaimer, the term of this patent is extended or adjusted under 35 U.S.C. 154(b) by 535 days.

(21) Appl. No.: 12/836,013

(22) Filed: Jul. 14, 2010

(65) Prior Publication Data
US 2011/0014936 A1   Jan. 20, 2011

Related U.S. Application Data

(60) Provisional application No. 61/225,904, filed on Jul. 15, 2009.

(51) Int. Cl.
*H04B 15/00* (2006.01)

(52) U.S. Cl.
USPC .......... 455/62; 455/509; 455/450; 455/452.1; 455/67.11; 455/67.13; 455/63.1; 370/329; 370/335; 370/342; 370/462

(58) Field of Classification Search
USPC ............ 455/62, 509, 63.1, 450, 452.1, 452.2, 455/67.11, 67.13; 370/329, 330, 335, 342, 370/462
See application file for complete search history.

(56) References Cited

U.S. PATENT DOCUMENTS

| | | | |
|---|---|---|---|
| 7,778,170 B2 * | 8/2010 | Aboba et al. | 370/230 |
| 7,969,927 B2 * | 6/2011 | Yu et al. | 370/315 |
| 7,978,657 B2 * | 7/2011 | Choi et al. | 370/332 |
| 7,995,526 B2 * | 8/2011 | Liu et al. | 370/329 |
| 8,040,815 B2 * | 10/2011 | Silk et al. | 370/252 |
| 8,073,452 B2 * | 12/2011 | Kossi et al. | 455/450 |
| 8,094,610 B2 * | 1/2012 | Wang et al. | 370/328 |
| 8,131,304 B2 * | 3/2012 | Chaudhri et al. | 455/450 |
| 8,144,725 B2 * | 3/2012 | Bienas et al. | 370/449 |
| 8,290,503 B2 * | 10/2012 | Sadek et al. | 455/452.1 |
| 8,295,153 B2 * | 10/2012 | Nentwig et al. | 370/204 |
| 8,295,226 B2 * | 10/2012 | Fujii et al. | 370/319 |
| 8,311,007 B2 * | 11/2012 | Grandblaise et al. | 370/329 |
| 8,326,309 B2 * | 12/2012 | Mody et al. | 455/452.1 |
| 8,340,060 B2 * | 12/2012 | Sahin et al. | 370/338 |
| 2008/0130519 A1 | 6/2008 | Bahl et al. | |

(Continued)

FOREIGN PATENT DOCUMENTS

| CN | 1399564 | 4/2009 |
|---|---|---|
| CN | 1437295 | 5/2009 |

(Continued)

*Primary Examiner* — Marceau Milord
(74) *Attorney, Agent, or Firm* — Lee, Hong, Degerman, Kang & Waimey (57) ABSTRACT

A method for facilitating radio communications includes receiving, at a first cognitive station (CS) from a cognitive central station (CCS), a message having a candidate list of one or more candidate frequencies, such that each frequency of the candidate list is a frequency at which each of a terminal, the CCS, and a primary station in communication range of the terminal is configured to operate. Further operations include measuring an availability of a frequency of the candidate list to form a first transmission parameter, determining, based upon the transmission parameter, a target frequency list indicating which frequency or frequencies of the candidate list is available for communication between the terminal and the CCS, and providing, to the terminal, an allocation message identifying one or more frequencies of the target frequency list at which the terminal is permitted to communicate with the CCS.

19 Claims, 6 Drawing Sheets

(56) References Cited

U.S. PATENT DOCUMENTS

| | | | |
|---|---|---|---|
| 2008/0159207 A1* | 7/2008 | Levine et al. | 370/329 |
| 2009/0067354 A1 | 3/2009 | Gao et al. | |
| 2009/0135744 A1 | 5/2009 | Chaudhri et al. | |
| 2010/0091701 A1* | 4/2010 | Youn et al. | 370/328 |
| 2011/0199965 A1* | 8/2011 | Ariyoshi et al. | 370/328 |

FOREIGN PATENT DOCUMENTS

| | | |
|---|---|---|
| KR | 10-2007-0048530 | 5/2007 |
| KR | 10-2009-0052547 | 5/2009 |
| WO | 2008/144323 | 11/2008 |

* cited by examiner

SYSTEM AND METHOD FOR COGNITIVE RADIO TRANSMISSION

CROSS-REFERENCE TO RELATED APPLICATIONS

Pursuant to 35 U.S.C. §119(e), this application claims the benefit of U.S. Provisional Application Ser. No. 61/225,904, filed Jul. 15, 2009, the contents of which are incorporated by reference herein in their entirety.

FIELD OF THE INVENTION

The present invention relates generally to wireless communications, and in particular, to facilitating cognitive radio (CR) communications.

DISCUSSION OF THE RELATED ART

Figure 1:
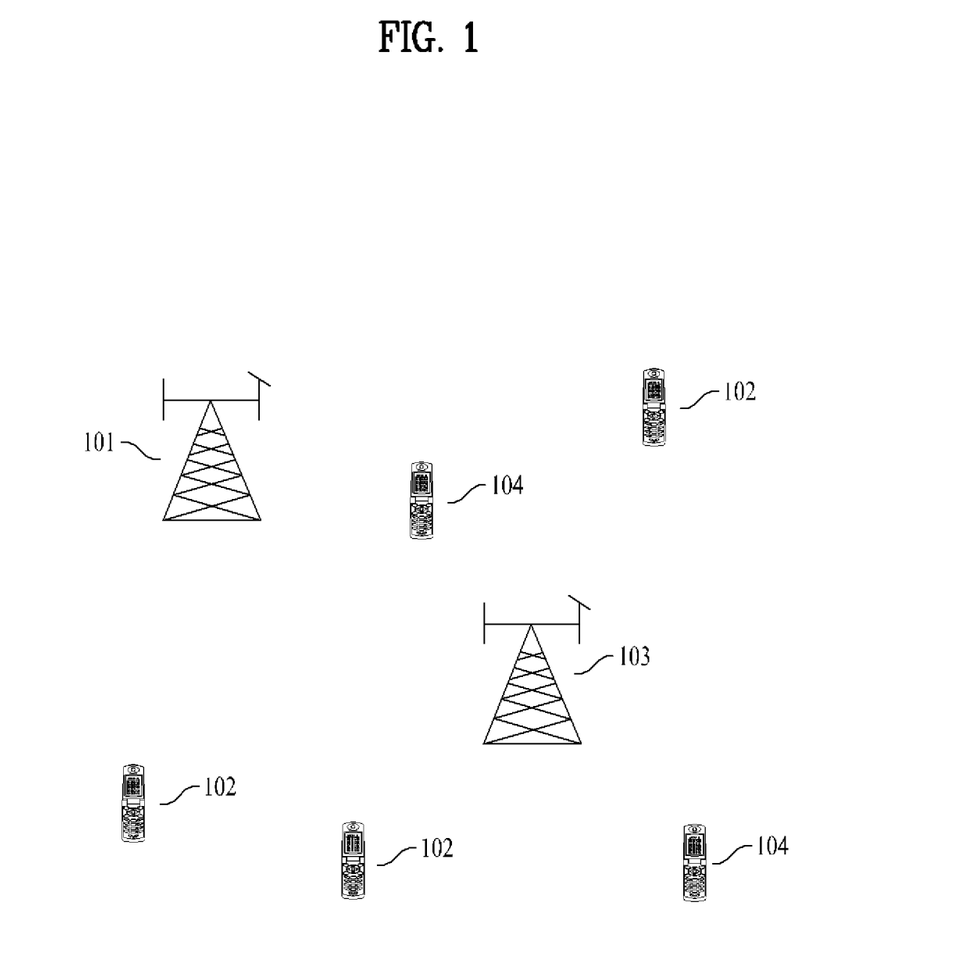
FIG. 1 shows a communications system including a cognitive radio communications system.

In a cognitive radio (CR) system, radio frequency (RF) spectrum resources are typically shared by both licensed users and CR-capable users. With reference to FIG. 1, the licensed users may include a base station 101 and one or more mobile terminals 102 configured to communicate with the base station 101. The CR-capable users may include CR mobile terminals 104 configured to communicate with a cognitive central station (CCS) 103.

The licensed users may be referred to as primary users because these users may be fully privileged to access and utilize the RF spectrum resources. As such, the base station 101 may be referred to as a primary receiver because, among other features, it receives communications from the mobile terminals 102. The base station 101 also transmits communications to the mobile terminals 102.

The CR-capable users are referred to as secondary users because, unlike the licensed users, the CR-capable users are not fully privileged to access and utilize the RF spectrum resources. Rather, the CR-capable users typically use the resources in a manner such that interference (generated by the CR-capable users) to the primary users is limited so as not to exceed a certain level (or levels). That is, in using the resources (e.g., for communications between the CCS 103 and the CR mobile terminals 104), the CR-capable users may be forced to keep interference to the primary users below a certain level.

While keeping interference below a certain limit is one aspect of cognitive radio, quality of service (QoS) is another aspect. For example, the secondary users also aim to communicate with one another using a power level (or levels) suitable for meeting QoS criteria, solely from the perspective of the secondary users. In order for both aspects to be reached, the terminals 104 are configured to measure (or sense) the surrounding RF environment in order to detect the presence of communications by the primary receiver 101. The terminals 104 perform these measuring (or sensing) functions in an accurate and reliable manner, quite possibly over a large range of frequencies in the spectrum.

SUMMARY

In accordance with an embodiment, a method for facilitating radio communications includes receiving, at a first cognitive station (CS) from a cognitive central station (CCS), a message having a candidate list of one or more candidate frequencies, such that each frequency of the candidate list is a frequency at which each of a terminal, the CCS, and a primary station in communication range of the terminal is configured to operate. Further operations include measuring an availability of a frequency of the candidate list to form a first transmission parameter, determining, based upon the transmission parameter, a target frequency list indicating which frequency or frequencies of the candidate list is available for communication between the terminal and the CCS, and providing, to the terminal, an allocation message identifying one or more frequencies of the target frequency list at which the terminal is permitted to communicate with the CCS.

In accordance with another embodiment, an apparatus for facilitating radio communications includes a receiver configured to receive from a CCS a message having a candidate list of one or more candidate frequencies, such that each frequency of the candidate list is a frequency at which each of a terminal, the CCS, and a primary station in communication range of the terminal is configured to operate. The apparatus further includes a processor configured to measure an availability of a frequency of the candidate list to form a first transmission parameter, and determine based upon the transmission parameter a target frequency list indicating which frequency or frequencies of the candidate list is available for communication between the terminal and the CCS. Also included is a transmitter configured to provide to the terminal, an allocation message identifying one or more frequencies of the target frequency list at which the terminal is permitted to communicate with the CCS.

In accordance with yet another embodiment, a method for facilitating radio communications includes permitting wireless communication between a terminal and a cognitive central station (CCS) via any of a first group of frequencies, wherein at least one of the first group of frequencies is a frequency associated with a primary station that is in communication range of the terminal; receiving, at a first cognitive station (CS) from the CCS, a message comprising a candidate list of one or more candidate frequencies, wherein each frequency of the candidate list is a frequency at which each of the terminal, the CCS, and the primary station are configured to operate, wherein the first CS is one of a plurality of CSs, and wherein one of the plurality of the CSs is a group leader CS; measuring, at the first CS, availability of a frequency of the candidate list to form a first transmission parameter; sending from the first CS to the group leader CS, the first transmission parameter; receiving, at the group leader CS, the first transmission parameter; determining, based upon the transmission parameter received from the first CS, a target frequency list indicating which frequency or frequencies of the candidate list is available for communication between the terminal and the CCS; broadcasting, by the group leader CS, an allocation message identifying one or more frequencies of the target frequency list; receiving, at the terminal, the allocation message; and transmitting, from the terminal, a communication to the CCS using a frequency of the target frequency list as identified in the allocation message.

These and other embodiments will also become readily apparent to those skilled in the art from the following detailed description of the embodiments having reference to the attached figures, the present disclosure not being limited to any particular embodiment disclosed.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Various embodiments will be presented herein in the context of a wireless cognitive radio (CR) communication system and associated entities configured in accordance with associated requirements and protocols. It is understood that such networks may include wireless communication systems using any of various air interfaces and/or physical layers including, for example, frequency division multiple access (FDMA), time division multiple access (TDMA), code division multiple access (CDMA), wideband CDMA (W-CDMA), and universal mobile telecommunications system (UMTS), the long term evolution (LTE) of the UMTS, and the global system for mobile communications (GSM), among others.

As demand for mobile broadband services increases, standardizations and developments of "Beyond 3G Systems" such as LTE and IEEE 802.16m have surfaced to address this ever-increasing demand. The term "broadband" suggests a large amount of bandwidth. As such, the amount of available bandwidth is an often desirable feature in the area of wireless communications. However, conventional bandwidth utilization is very often static. According to such utilization schemes, one or more portions of the frequency spectrum are fixed (or allocated) for a certain application.

Regarding these utilization schemes, two notable observations have been made. First, the actual utilization of allocated portions may be surprisingly low in many frequency bands of interest. Second, it may be difficult to find new (i.e., unused) frequency bands having favorable (or at least benign) conditions.

In light of such issues, cognitive radio (CR) transmission has drawn much interest. As described earlier, in order to meet interference- and quality-of-service-(QOS) related goals, CR-capable terminals (also referred to herein as CR mobile terminals or CR terminals) are configured to accurately measure or sense the surrounding RF environment, quite possibly over a large range (or ranges) of frequencies. However, these functions may be computationally complex and, therefore, require, considerable amounts of processing resources. Further, the performance of these functions may draw significant amounts of electrical power.

Such amounts of electrical power could be more readily provided from a power source such as a device battery of a suitably large physical size. A battery of a smaller size may also be able to provide the required power, but its charge might run out quickly. However, an increase in the size of the device battery could adversely affect the portability of the CR terminal. As with mobile devices in general, a current trend in the design of CR mobile terminals is toward devices that are smaller in physical size and are, therefore, more portable and easier to carry. Therefore, there is a tension between a goal of increasing power storage capacity (e.g., for driving spectrum-sensing functionalities) and a goal of improving the portability of CR mobile terminals.

Therefore, embodiments of the present invention are directed towards reducing the workload (e.g., workload associated with spectrum sensing) performed by CR terminals, in order to moderate or reduce the power consumed by such devices.

According to some examples, one or more cognitive stations (CS) are provided to offload at least some of the workload of the CR terminals. In an embodiment, the CS is configured to perform at least some spectrum-sensing functions that might otherwise be performed by the CR terminal. As such, the workload performed by the CR terminal is reduced, and the CR terminal's power consumption is moderated. Because spectrum-sensing functions are performed by the CS, the surrounding RF environment is suitably sensed such that interference- and QOS-related metrics, as well as other parameters, of the CR communications system can be satisfied.

Figure 2:
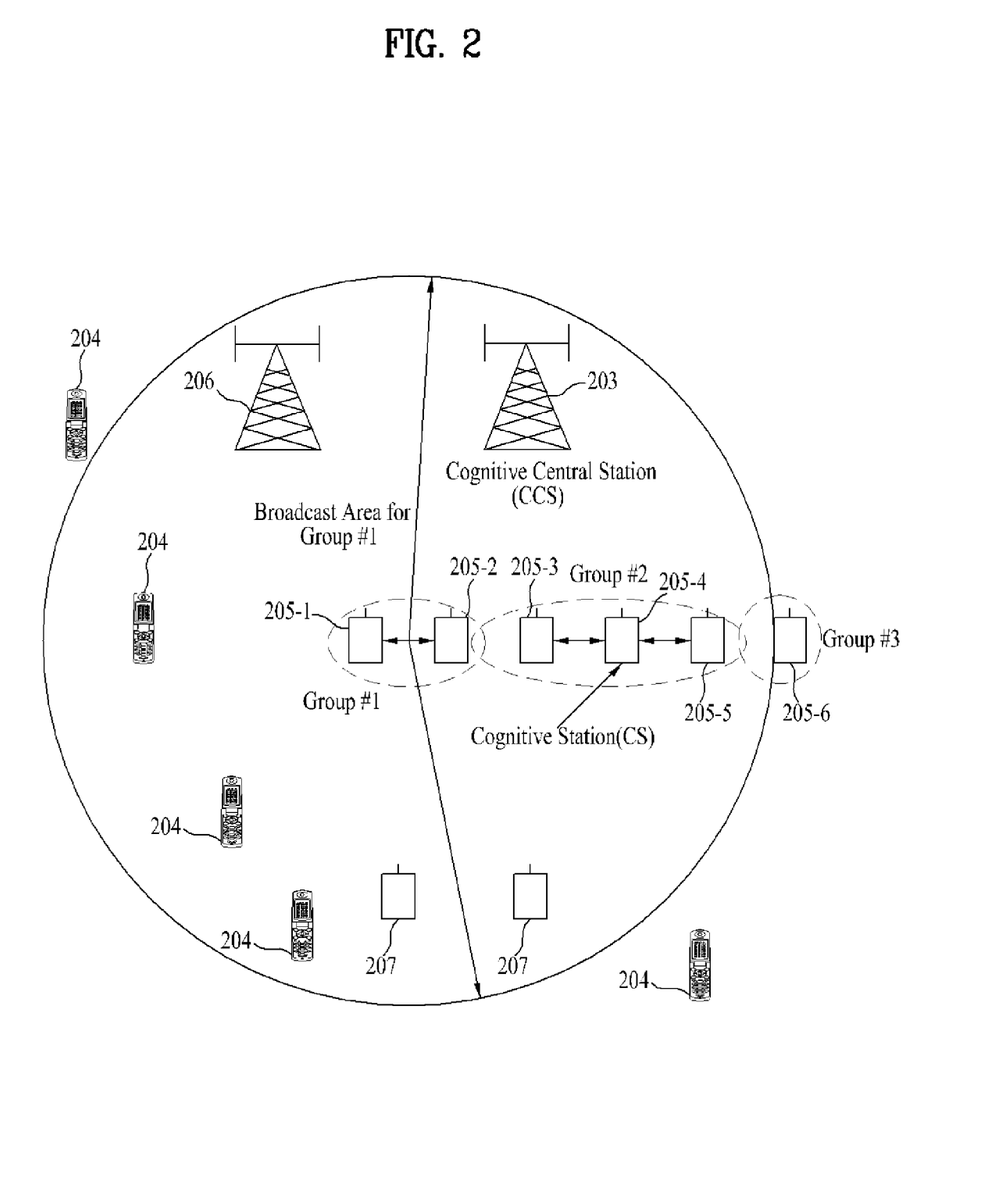
FIG. 2 shows a communications system including a cognitive radio communications system, according to an embodiment.

With reference to FIG. 2, a system including a CR communications system will now be described in more detail according to one embodiment. The CR communications system includes a cognitive central station (CCS) (or secondary receiver) 203 and one or more CR mobile terminals 204 configured to communicate with the CCS 203. The system further includes one or more cognitive stations (CS) 205. As will be described in more detail below, the cognitive stations 205 may be divided into two or more groups.

CCS 203, CR mobile terminals 204, and cognitive stations 205 co-exist with licensed users, which include a base station or primary receiver 206 that is in communication with one or more mobile terminals 207. CR mobile terminals 204 may be in communication range of base station 206. As such, interference to the base station, caused by the CR mobile terminals 204, is a potential concern.

The CCS 203 may be implemented using a base transceiver station (BTS), a NodeB, an evolved NodeB (eNB), an access point (AP), or a similar device. The CCS 203 generally has a backhaul connection. The backhaul connection may be configured in accordance with any of several known interfaces including, for example, E1/T1, ATM, IP, PPP, Frame Relay, HDSL, ADSL, or xDSL.

The system of FIG. 2 includes two or more cognitive stations 205, each assigned to one of two or more groups. For example, cognitive stations 205-1 and 205-2 are shown assigned to a first group (group #1), cognitive stations 205-3, 205-4 and 205-5 are assigned to a second group (group #2), and cognitive station 205-6 is assigned to a third group (group #3).

In some scenarios, each of the groups is assigned to monitor one or more corresponding portions (e.g., one or more frequencies) of the spectrum. For instance, each group monitors a respective portion of the spectrum, and the respective portions are different from one another. In addition, in each group, one CS of the group may be designated as a "group leader" CS.

During operation, CCS 203 broadcasts information to the cognitive stations 205. This information may indicate the assignment of a certain CS 205 to a certain group (e.g., group #1, group #2, or group #3). For example, the information may indicate that stations 205-1 and 205-2 are assigned to group #1, that stations 205-3, 205-4 and 205-5 are assigned to group #2, and that station 205-6 is assigned to group #3.

In addition, the information may indicate the designation of one CS 205 in each group as the group leader of that group. It is understood that in a group consisting of only a single CS 205, the single CS 205 may be designated as the group leader by default. For example, the information may indicate that stations 205-1, 205-3 and 205-6 are designated as the group leaders of groups 1, 2 and 3, respectively.

As a further feature, for each group, the information may additionally or alternatively identify one or more candidate frequencies. The candidate frequencies are frequencies that are to be monitored by the cognitive stations 205 in a particular group.

According to various embodiments, the CCS 203 addresses the cognitive stations 205 of a particular group using a group-specific code (or identifier), a group-specific broadcast timing, and/or a group-specific frequency allocation. For example, each group may be assigned a corresponding code (or identifier), time slot, frequency resource, beam pattern, and/or a combination thereof, such that the CCS 203 may address the groups individually. As will be described later in more detail, a group leader CS 205 may, in turn, address CR mobile terminals 204 using one or more of the above-noted techniques. For example, if a group leader CS 205 addresses CR mobile terminals 204 using a group-specific code, then a CR mobile terminal 204 receiving the group leader's broadcast can recognize the group leader CS as the source of the broadcast.

Over time, the CCS 203 will generally adaptively reassign (or newly assign) cognitive stations to existing (or newly created) groups. The adaptations may be carried out by broadcasting information from the CCS 203 to the cognitive stations 205, as described above. For example, the CCS 203 may newly assign additional cognitive stations to an existing group to increase the number of cognitive stations in the group. As described previously, the cognitive stations within a group may be configured to perform spectrum sensing functions of one or more portions of the spectrum.

By increasing the number of cognitive stations in the group, the CCS 203 effectively increases a degree of collaborative sensing by the cognitive stations. As such, the cognitive stations may provide more reliable and more accurate measurements on the sensed spectrum and, therefore, decrease the probability of false detection. The CCS 203 may increase the number of cognitive stations in a group, for example, when regulations or requirements regarding utilization by secondary users of a corresponding portion of the spectrum are tightened and/or made more stringent.

As described above, information broadcast by the CCS 203 to the cognitive stations 205 may indicate one or more of: the identity of the group to which a cognitive station 205 is assigned; the identities of the cognitive stations 205 in a particular group; the designation of one cognitive station 205 in a group as the group leader of that group; or a list of candidate frequencies assigned to a particular group for sensing.

If desired, information broadcast by the CCS 203 to the cognitive stations 205 may further indicate one or more of: one or more thresholds associated with the candidate frequencies; geographical information regarding the location of the primary receiver 206 and the location of the CCS 203; or geographical information regarding the location of the cognitive stations 205.

Figure 3:
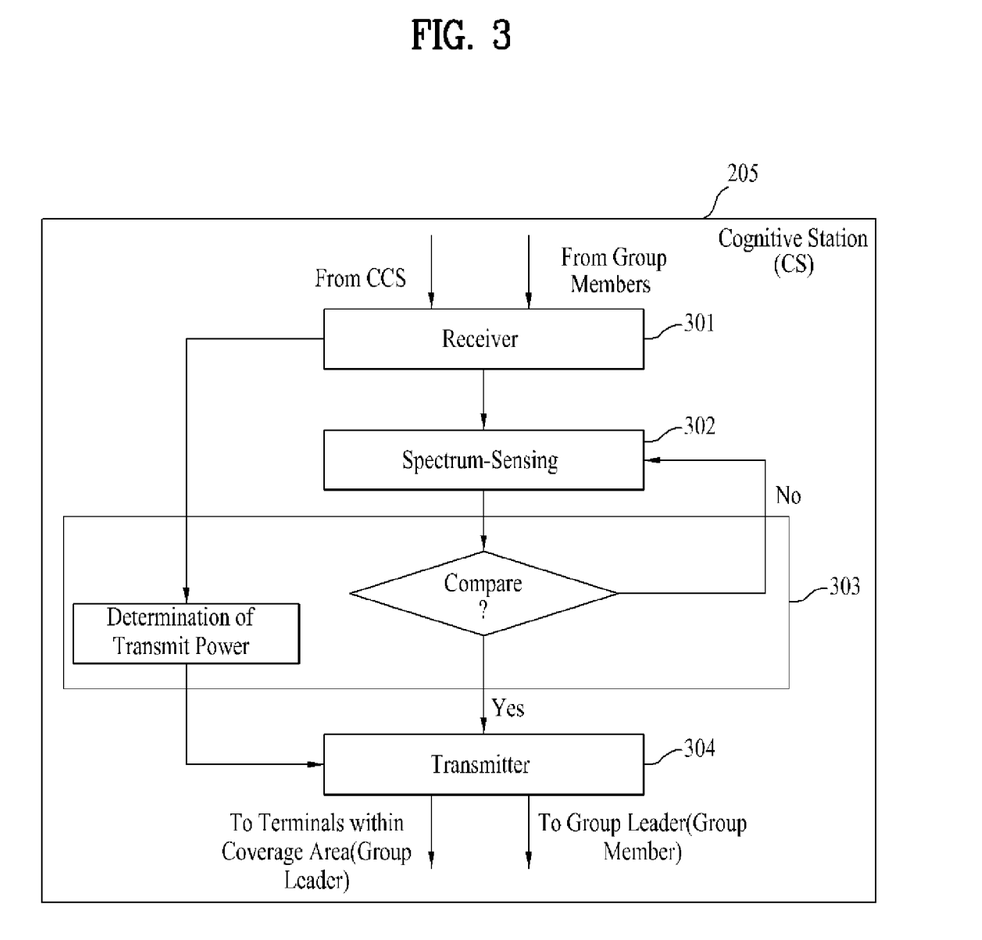
FIG. 3 shows a block diagram of a cognitive station according to an embodiment.

With reference to FIG. 3, a cognitive station 205 according to one embodiment will now be described. The CS 205 includes a receiver 301 that may be configured to receive the above-described information broadcast by the CCS 203. Furthermore, the receiver 301 may also be for receiving information provided by another cognitive station 205 in the system. As will be described in more detail later, if a cognitive station 205 is designated as a group leader, it may receive information provided by other cognitive stations 205 in its group.

With continued reference to FIG. 3, the cognitive station 205 further includes a sensor 302 for sensing the surrounding environment at one or more frequencies. As described earlier, the frequencies may be specified by the information received at the receiver 301. According to one embodiment, only those cognitive stations that are not group leader cognitive stations perform such sensing functions. According to another embodiment, cognitive stations that are group leaders, as well as non-group-leader cognitive stations, perform such sensing functions.

According to one embodiment, the sensor 302 monitors a certain frequency (or frequencies) to detect the presence of a signal on the frequency (or frequencies). For example, in the context of a CR communications system, the sensor 302 may monitor a frequency to detect the presence of a signal of the primary receiver. It is understood that the sensor 302 may be similar to sensors and/or sensing devices employed by conventional CR terminals for spectrum sensing. For example, the sensor 302 may use sensing techniques such as matched filter detection, energy detection, and/or cyclostationary detection.

The cognitive station 205 also includes one or more processors 303 for forming (or defining) certain parameters and for making one or more determinations. According to one embodiment, one parameter formed by the processor 303 is a binary parameter regarding the availability of a candidate frequency for utilization by the secondary users (e.g., for transmission by a CR mobile terminal 204 to the CCS 203). In more detail, the processor 303 compares the strength of a primary-receiver signal (e.g., as sensed by the sensor 302 on a candidate frequency) against a certain threshold. According to a further embodiment, the threshold is specified by the information broadcast by the CCS 203.

For example, if the strength of the primary-receiver signal is below the threshold, then the CS 205 forms a parameter indicating that the candidate frequency is available for utilization by secondary users. Conversely, if the strength of the primary-receiver signal is above a certain threshold, then the CS 205 forms a parameter indicating that the candidate frequency is not available for utilization by the secondary users. The CS 205 continues to sense the candidate frequency (or frequencies) to determine its availability for utilization (see, e.g., box 302 of FIG. 3).

In response to a parameter such as that described above, a receiving CR terminal may drop (or terminate) its transmissions on a certain frequency upon learning that the frequency is not available for utilization.

Based on the above-described parameters, the processor 303 may also define a list of one or more target frequencies. For example, the target frequencies correspond to the candidate frequencies determined to be available for utilization by the secondary users.

According to another embodiment, the processor 303 forms a parameter that may span a range of values (rather than merely whether or not a candidate frequency is available). For example, the parameter corresponds to a permissible level of interference using a metric such as an interference temperature. As one example, and as defined by the Federal Communications Commission (FCC), an interference temperature is a temperature equivalent to the RF power available at a receiving antenna per unit bandwidth, measured in units of degrees Kelvin.

In response to a parameter such as that described above, a receiving CR terminal may control its transmission power on a certain frequency such that its transmissions are in compliance with the reported level of permissible interference. Alternatively, the parameter formed by the processor 303 corresponds to a permissible interference level at a candidate frequency determined to be available for utilization.

With continued reference to FIG. 3, the CS 205 also includes a transmitter 304. If the CS 205 is not designated as a group leader CS, the transmitter 304 is for transmitting the parameter(s) and/or determination(s) to the group leader cognitive station corresponding to the cognitive station.

If the cognitive station 205 is designated as a group leader of a certain group, it may perform additional or other functions with respect to those described earlier. For example, in a group leader cognitive station 205, the receiver 301 is also for receiving information transmitted by cognitive stations in its group. As such, the group leader collects parameters (or determinations) formed by the cognitive stations in its group. As described earlier, these parameters (or determinations) may include parameters formed by the group leader itself (i.e., in its capacity as a cognitive station).

The processor 303 of the group leader cognitive station forms broadcast information based upon the collected data. This information is broadcast to CR terminals by the transmitter 304. With regards to the availability of one or more candidate frequencies, the broadcast information may include an allocation message indicating target frequencies that are available for utilization.

According to one embodiment, the processor 303 selects the broadcast information as information reported by one of the cognitive stations in its group. For example, with reference to FIG. 2, the group leader 205-3 may decide to broadcast the information that was reported by cognitive station 205-4. Such a selection may be based, for example, on a determined reliability or sensing accuracy of the selected cognitive station and/or its determined proximity to a primary receiver and/or one or more CR terminals 204.

According to a further embodiment, the processor 303 also includes in the broadcast information the location of the selected cognitive station (e.g., cognitive station 205-4), the location of the CCS 203, and/or the location of the primary receiver 201. The location information may be absolute (e.g., specific geographic coordinates) or relative (e.g., the distance of the selected cognitive station relative to the CCS 203).

According to another embodiment, the processor 303 produces the broadcast information as a combination (e.g., a mathematical combination) of the collected data. For example, according to a particular embodiment, the combination is an "average" of the collected data. As previously described, the collected data may include binary parameters (e.g., indicating that a frequency is/is not available for transmission by secondary users). In this regard, the "average" may be a calculated ratio of (1) the number of different cognitive stations reporting that the frequency is (or is not) available to (2) the total number of reporting cognitive stations. As also previously described, the collected data may include permissible interference levels based on interference temperatures. In this regard, the "average" may be a mathematical average of the collected interference levels.

As previously described, the group leader collects parameters (or determinations) formed by the cognitive stations in its group. According to one embodiment, if at least one of the cognitive stations in its group (e.g., any one of the cognitive stations) determines that a given frequency (or frequencies) is not available, the processor 303 produces broadcast information indicating that the frequency (or frequencies) is not available for utilization.

According to a further embodiment, the processor 303 also includes in the broadcast information its own location (i.e., the location of the group leader), the location of the CCS 203, and/or the location of the primary receiver 201. The location information may be absolute (e.g., specific geographic coordinates) or relative (e.g., the distance of the group leader cognitive station relative to the CCS 203).

In addition to selecting the broadcast information, the processor 303 also determines the coverage area of its broadcast (see, e.g., the broadcast area illustrated in FIG. 2). By determining its broadcast transmission power, the processor effectively determines the coverage area. For example, at a certain transmission power, CR terminals located relatively far from the group leader cognitive station will still be able to "hear" the broadcast (see, e.g., the CR terminals 204 of FIG. 2 that are located outside the illustrated circle). However, at a lower transmission power, only those CR terminals located more closely to the group leader cognitive station (e.g., the CR terminals 204 of FIG. 2 that are located inside the illustrated circle and, therefore, within, the broadcast area of group #1) may be able to "hear" the broadcast.

According to various embodiments, only those CR terminals that are within the coverage area of the group leader cognitive station are eligible for secondary transmission to the CCS 203. That is, CR terminals that are outside of this coverage area cannot hear the broadcast and, therefore, are not eligible for secondary transmission to the CCS 203.

The processor 303 determines the broadcast transmission power to be of a suitable level such that secondary transmissions from receiving CR terminals will be (a) of a sufficiently low level so as not to impermissibly interfere with the primary receiver and (b) of a sufficiently high level so as to provide sufficient energy for reliable reception at the CCS 203. As such, the processor 303 may determine the broadcast transmission power (or coverage area) based on threshold information provided by the CCS 203, information collected from its reporting cognitive stations, and/or location information regarding the CCS 203 and the primary receiver.

It is appreciated that some pieces of information transmitted from the group leader CSs may be more static (i.e., less dynamic) than other pieces of information transmitted from the group leader CSs. For example, information indicating the geographical location of the primary and secondary receivers may not change as often as other information that is transmitted from the group leader CSs. Therefore, according to certain embodiments, the frequency of transmission of the static (or semi-static) information (i.e., how often such information is transmitted) is relatively low compared to the frequency of more dynamic information (e.g., permissible interference levels). In particular embodiments, in which the cognitive stations are mobile and not stationary, the information measured by the cognitive stations (and broadcast by the group leader CSs) may be more dynamic.

As described earlier, according to various embodiments, the CCS 203 addresses the cognitive stations 205 of a particular group using a group-specific code (or identifier), a group-specific broadcast timing, and/or a group-specific frequency allocation. Accordingly, a group leader CS 205 may, in turn, address the CR mobile terminals 204 using such techniques. For example, each group of cognitive stations may be assigned a certain code, time slot, frequency resource, beam pattern, or combination thereof for communicating between cognitive stations of a certain group. Furthermore, communications between the cognitive stations and the group leader may be conducted according to a different protocol. For example, such communications may be conducted using Bluetooth®, ZigBee®, or WLAN. The group leader CS may transmit group-specific information to CR mobile terminals 204 by using the assigned resources (e.g., a certain code, time slot, frequency resource, beam pattern, or combination thereof).

The CR mobile terminals receive group-related information in the broadcasts from the group leader CS. (The CR mobile terminals may also receive similar information from the CCS.) To collect information regarding a particular spectrum band, the CR mobile terminal processes information that it receives from the corresponding group(s).

The CR mobile terminals that are within the coverage area of the broadcasting group leader CS perform transmissions to the CCS according to such information. For example, according to various embodiments, based on such information, the CR mobile terminal determines the transmission parameters (e.g., modulation, coding rate, and power) by which it transmits signals to the secondary receiver (CCS). The CR mobile terminal may determine its transmission parameters based on its current geographical location. The current location can be determined by GPS, A-GPS, network-assisted mechanisms, etc.

According to various embodiments, based on information including information that it receives from the group leader CS regarding the geographical location of the group leader, the current location (e.g., GPS measurement) of the CR mobile terminal, and the measured spectrum information that it receives from the group leader CS, the CR mobile terminal determines the transmission power at which it transmits signals to the CCS (secondary receiver).

An operation of an illustrative system will now be described according to one embodiment, with reference to FIGS. 3 and 4. Such a system includes a CCS (e.g., CCS 203 of FIG. 2) and four cognitive stations (e.g., cognitive stations 205 of FIG. 2) A, B, C, and D. Three frequencies are of interest: f1, f2, and f3.

Figure 4:
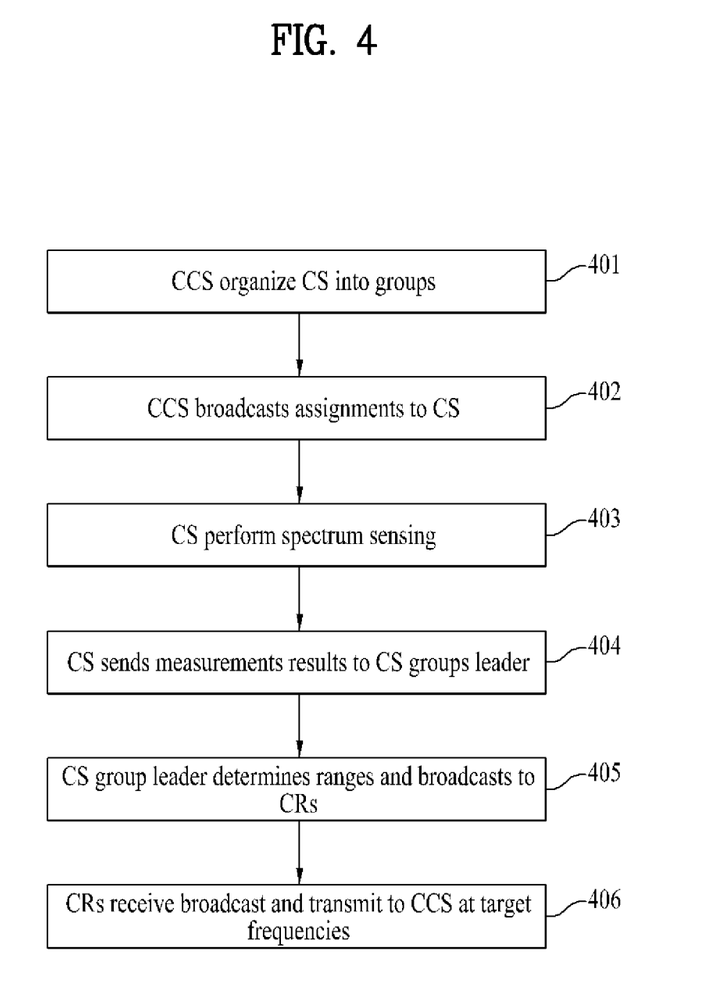
FIG. 4 shows an operational flowchart according to an embodiment.

With reference to FIG. 4, block 401, the CCS organizes the cognitive stations A, B, C and D into groups. For example, the CCS may assign each of the cognitive stations into one of two groups: group 1 (to include cognitive stations A and B) and group 2 (to include cognitive stations C and D).

Further, with respect to each group, the CCS designates one cognitive station in the group as the group leader of that group. For example, the CCS may designate cognitive station A as the group leader of group 1 and cognitive station C as the group leader of group 2. In addition, the CCS may assign the cognitive stations of group 1 the task of monitoring frequencies f1 and f2 based on certain thresholds. Similarly, the CCS may assign the cognitive stations of group 2 the task of monitoring frequency f3 based on a certain threshold.

In block 402, the CCS broadcasts signals providing the above-noted information (e.g., group assignments, group leader designations, and frequency-monitoring assignments) to the cognitive stations A, B, C and D. The CCS may also broadcast to the cognitive stations other pieces of information, as previously described. For example, the CCS may broadcast the above-described information and group-specific information to the terminals within its coverage area. The group-specific information may include a group-specific code (or identifier), a group-specific broadcast timing, and/or a group-specific frequency allocation used by the CCS in addressing the cognitive stations of a certain group.

In block 403, cognitive station B (of group 1) performs measurements of its surrounding environment on frequencies f1 and f2. (It is appreciated that the group leader (cognitive station A) may also perform such measurements.) According to block 404, cognitive station B provides its measurement results to its group leader, cognitive station A.

Similarly, at block 403, cognitive station D (of group 2) performs measurements of its surrounding environment on frequency f3. It is appreciated that the group leader (cognitive station C) may also perform such measurements. At block 404, cognitive station D provides its measurement results to its group leader, cognitive station C.

Block 405 includes cognitive station A determining interference-related information regarding frequencies f1 and f2 based on measurement results that it received from cognitive station B (and/or its own measurement results). In addition, cognitive station A broadcasts the interference-related information to the CR mobile terminals. Cognitive station A may also broadcast the geographical location of cognitive stations A and B. The broadcasts may be transmitted at a determined transmission power, which is determined such that a CR mobile terminal that is within range of the broadcast would not generate an unacceptable level of interference to the primary receiver (while also providing sufficiently strong signals to the secondary receiver).

Similarly, also with reference to FIG. 4, block 405, cognitive station C determines interference-related information regarding frequency f3 based on measurement results that it received from cognitive station D (and/or its own measurement results). In addition, cognitive station C broadcasts the interference-related information to the CR mobile terminals. Cognitive station C may also broadcast the geographical location of cognitive stations C and D. The broadcasts may be transmitted at a determined transmission power, which is determined such that a CR mobile terminal that is within range of the broadcast would not generate an unacceptable level of interference to the primary receiver (while also providing sufficiently strong signals to the secondary receiver).

Next, at block 406, a CR mobile terminal receiving the broadcast from cognitive station A (cognitive station C) communicates with the secondary receiver on frequencies f1 and f2 (frequency f3) based on the received broadcast information. The communications with the secondary receiver may also be based on the location of the secondary receiver and the primary receiver relative to the CR mobile terminal.

According to embodiments of the invention, the burden associated with spectrum sensing is generally shifted from the CR mobile terminals to the cognitive stations. According to some embodiments, this burden is partially shifted from the CR mobile terminals to the cognitive stations. For example, the responsibility of sensing certain portions of the spectrum may be shifted from the CR mobile terminals to the cognitive stations, and the CR mobile terminals may retain the responsibility of sensing other portions of the spectrum. According to other embodiments, the CR mobile terminal utilizes spectrum data as measured by the cognitive stations in order to reduce its own computational workload.

According to embodiments of the invention, the cognitive station directly receives signals from, but does not directly transmit signals to, the CCS. Alternatively, the cognitive station may directly transmit signals to the CCS. For example, the cognitive station may serve as a relay between the CR mobile terminal and the CCS. It is appreciated that, at least in certain instances, a direct transmission from the CR mobile terminal to the CCS may cause an unacceptable (or undesirable) level of interference to a primary receiver due to the physical distance between the CR mobile terminal and the CCS. In such instances, the cognitive station may relay signals received from the CR mobile terminal to the CCS when such a routing would reduce the level of interference to the primary receiver.

According to various embodiments, the burden of (or work associated with) cognitive spectrum sensing is shifted (at least partially) from the terminal side (e.g., the CR mobile station) to the network side (e.g., the cognitive station). As such, the power consumed by CR mobile stations may be reduced. Therefore, the overall performance of the CR system is improved. In some instances, the burden of (or work associated with) cognitive spectrum sensing is shifted (at least partially) to cognitive stations located at the network side of the CR system.

Some embodiments permit groups of two or more cognitive stations to effectively work together to provide cooperative sensing of the spectrum. For example, each of the groups is assigned to sense a corresponding one or more frequency bands of the spectrum. Results of the sensing, along with geographical information, are sent by the cognitive stations to a group leader cognitive station which, in turn, provides information to CR mobile terminals of its group.

According to information provided by the group leader cognitive station along with other information (e.g., the geographical locations of the CR mobile terminals themselves), CR mobile terminals may determine the power at which they can transmit (e.g., to the cognitive central station) in the corresponding spectrum band(s).

Figure 5:
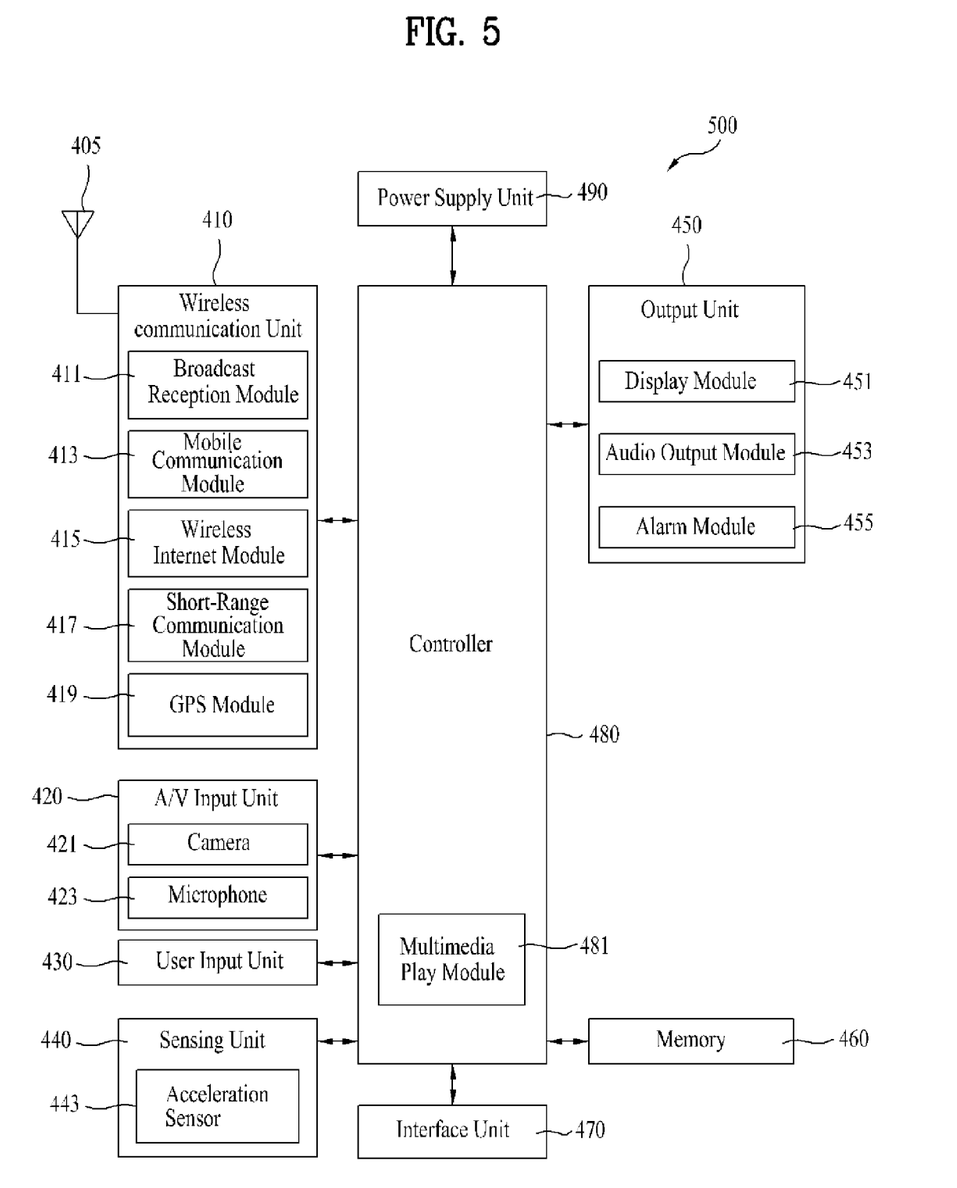
FIG. 5 is a block diagram of a terminal according to various embodiments of the present invention.

FIG. 5 is a block diagram of a terminal according to various embodiments of the present invention. In general, CR mobile terminals 204, cognitive stations 205, and mobile terminals 207, may be variously implemented using some or all of the components shown in this figure. It is understood that greater or fewer components than those shown may be implemented.

Referring to FIG. 5, the terminal 500 may include a wireless communication unit 410, an audio/video (A/V) input unit 420, a user input unit 430, a sensing unit 440, an output unit 450, a memory 460, an interface unit 470, a controller 480, and a power supply unit 490. Two or more of the wireless communication unit 410, the A/V input unit 420, the user input unit 430, the sensing unit 440, the output unit 450, the memory 460, the interface unit 470, the controller 480, and the power supply unit 490 may be incorporated into a single unit, or some of the wireless communication unit 410, the A/V input unit 420, the user input unit 430, the sensing unit 440, the output unit 450, the memory 460, the interface unit 470, the controller 480, and the power supply unit 490 may be divided into two or more smaller units.

The wireless communication unit 410 may include a broadcast reception module 411, a mobile communication module 413, a wireless Internet module 415, a short-range communication module 417, and a global positioning system (GPS) module 419.

The broadcast reception module 411 receives a broadcast signal and/or broadcast-related information from an external broadcast management server through a broadcast channel. Examples of a broadcast channel include a satellite channel and a terrestrial channel. The broadcast management server may be a server which generates broadcast signals and/or broadcast-related information and transmits the generated broadcast signals and/or the generated broadcast-related information or a server which receives and then transmits previously-generated broadcast signals and/or previously-generated broadcast-related information.

Examples of broadcast-related information include broadcast channel information, broadcast program information, and broadcast service provider information. Examples of the broadcast signal include a TV broadcast signal, a radio broadcast signal, a data broadcast signal, or the combination of a data broadcast signal and either a TV broadcast signal or a radio broadcast signal. The broadcast-related information may be provided to terminal 204 through a mobile communication network. In this case, the broadcast-related information may be received by the mobile communication module 413, rather than by the broadcast reception module 411. The broadcast-related information may come in various forms, for example, electronic program guide (EPG) of digital multimedia broadcasting (DMB) or electronic service guide (ESG) of digital video broadcast-handheld (DVB-H).

Broadcast reception module 411 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 411 may be configured to be suitable for nearly all types of broadcasting systems other than those set forth herein.

The broadcast signal and/or the broadcast-related information received by the broadcast reception module 411 may be stored in memory 460.

The mobile communication module 413 transmits wireless signals to or receives wireless signals from at least one or more of a base station, an external station, and a server through a mobile communication network. The wireless signals may include various types of data according to whether the terminal 204 transmits/receives voice call signals, video call signals, or text/multimedia messages.

The wireless Internet module 415 may be a module for wirelessly accessing the Internet. The wireless Internet module 415 may be embedded in the terminal 204 or may be installed in an external device.

The short-range communication module 417 may be a module for short-range communication. The short-range communication module 417 may use various short-range communication techniques such as Bluetooth®, radio frequency identification (RFID), infrared data association (IrDA), ultra wideband (UWB), and ZigBee®. The GPS module 419 may receive position information from one or more satellites (e.g., GPS satellites).

The A/V input unit 420 may be used to receive audio signals or video signals. The A/V input unit 420 may include one or more cameras 421 and a microphone 423. The camera 421 processes various image frames such as still images or moving images captured by an image sensor during a video call mode or an image capturing mode. The image frames processed by the camera 421 may be displayed by a display module 451.

The image frames processed by the camera 421 may be stored in the memory 460 or may be transmitted outside the terminal 204 through the wireless communication unit 410. The terminal may include more than two cameras.

The microphone 423 receives external sound signals during a call mode, a recording mode, or a voice recognition mode with the use of a microphone and converts the sound signals into electrical sound data. In the call mode, the mobile communication module 413 may convert the electrical sound data into data that can be readily transmitted to a mobile communication base station and then output the data obtained by the conversion. The microphone 423 may use various noise removal algorithms to remove noise that may be generated during the reception of external sound signals.

The user input unit 430 generates key input data based on user input for controlling the operation of the terminal 204. The user input unit 430 may be implemented as a keypad, a dome switch, a touch pad (either static pressure or constant electricity), a jog wheel, or a jog switch. In particular, if the user input unit 430 is implemented as a touch pad and forms a mutual layer structure along with the display module 451, the user input unit 430 and the display module 451 may be collectively referred to as a touch screen.

The sensing unit 440 determines a current state of the terminal 204 such as whether the terminal is opened or closed, the position of the terminal and whether the terminal is placed in contact with a user. In addition, the sensing unit 440 generates a sensing signal for controlling the operation of the terminal.

For example, when the terminal 204 is a slider-type mobile phone, the sensing unit 440 may determine whether the terminal is opened or closed. In addition, the sensing unit 440 may determine whether the terminal is powered by the power supply unit 490 and whether the interface unit 470 is connected to an external device.

The sensing unit 440 may include an acceleration sensor 443. Acceleration sensors are a type of device for converting an acceleration variation into an electric signal. With recent developments in micro-electromechanical system (MEMS) technology, acceleration sensors have been widely used in various products for various purposes. For example, an acceleration sensor may be used as an input device for a computer game and may sense the motion of the human hand during a computer game.

Two or three acceleration sensors 443 representing different axial directions may be installed in the terminal 204. Alternatively, only one acceleration sensor 443 representing a Z axis may be installed in the CR mobile terminal 204.

The output unit 450 may output audio signals, video signals, and alarm signals. The output unit 450 may include the display module 451, an audio output module 453, and an alarm module 455.

The display module 451 may display various information processed by the terminal 204. For example, if terminal is in a call mode, the display module 451 may display a user interface (UI) or a graphical user interface (GUI) for making or receiving a call. If the terminal is in a video call mode or an image capturing mode, the display module 451 may display a UI or a GUI for capturing or receiving images.

If the display module 451 and the user input unit 430 form a mutual layer structure and are thus implemented as a touch screen, the display module 451 may be used not only as an output device but also as an input device. If the display module 451 is implemented as a touch screen, the display module 451 may also include a touch screen panel and a touch screen panel controller.

The touch screen panel is a transparent panel attached onto the exterior of the terminal 204 and may be connected to an internal bus of the terminal. The touch screen panel monitors whether the touch screen panel is touched by a user. Once a touch input to the touch screen panel is detected, the touch screen panel transmits a number of signals corresponding to the touch input to the touch screen panel controller.

The touch screen panel controller processes the signals transmitted by the touch screen panel and transmits the processed signals to the control unit 480. The control unit 480 then determines whether a touch input has been generated and which part of the touch screen panel has been touched based on the processed signals transmitted by the touch screen panel controller.

As described above, if the display module 451 and the user input unit 430 form a mutual layer structure and are thus implemented as a touch screen, the display module 451 may be used not only as an output device but also as an input device. The display module 451 may include at least one of a liquid crystal display (LCD), a thin film transistor (TFT)-LCD, an organic light-emitting diode (OLED), a flexible display, and a three-dimensional (3D) display.

The terminal 204 may include two or more display modules 451. For example, the terminal 204 may include an external display module and an internal display module.

The audio output module 453 may output audio data received by the wireless communication unit 410 during a call reception mode, a call mode, a recording mode, a voice recognition mode, or a broadcast reception mode or may output audio data present in the memory 460. In addition, the audio output module 453 may output various sound signals associated with the functions of the terminal 204 such as receiving a call or a message. The audio output module 453 may include a speaker and a buzzer.

The alarm module 455 may output an alarm signal indicating the occurrence of an event in the terminal 204. Examples of the event include receiving a call signal, receiving a message, and receiving a key signal. Examples of the alarm signal output by the alarm module 455 include an audio signal, a video signal, and a vibration signal.

The alarm module 455 may output a vibration signal upon receiving a call signal or a message. In addition, the alarm module 455 may receive a key signal and may output a vibration signal as feedback to the key signal.

Once a vibration signal is output by the alarm module 455, the user may recognize that an event has occurred. A signal for notifying the user of the occurrence of an event may be output by the display module 451 or the audio output module 453.

The memory 460 may store various programs necessary for the operation of the controller 480. In addition, the memory 460 may temporarily store various data such as a phonebook, messages, still images, or moving images.

The memory 460 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The CR mobile terminal 204 may operate a web storage, which performs the functions of the memory 460 on the Internet.

The interface unit 470 may interface with an external device that can be connected to the terminal 204. The interface unit 470 may be a wired/wireless headset, an external battery charger, a wired/wireless data port, a card socket such as for a memory card or a subscriber identification module (SIM)/user identity module (UIM) card, an audio input/output (I/O) terminal, a video I/O terminal, or an earphone.

The interface unit 470 may receive data from an external device or may be powered by an external device. The interface unit 470 may transmit data provided by an external device to other components in the terminal 204 or may transmit data provided by other components in the terminal 204 to an external device.

The controller 480 may control the general operation of the CR mobile terminal 204. For example, the controller 480 may perform various control operations regarding making/receiving a voice call, transmitting/receiving data, or making/receiving a video call.

The controller 480 may include a multimedia play module 481, which plays multimedia data. The multimedia play module 481 may be implemented as a hardware device and may be installed in the controller 480. Alternatively, the multimedia play module 481 may be implemented as a software program.

The power supply unit 490 is supplied with power by an external power source or an internal power source and supplies power to other components in the CR mobile terminal 204.

In alternative implementations, certain logic operations may be performed in a different order, modified or removed and still implement exemplary embodiments of the present invention. Moreover, operations may be added to the above described logic and still conform to assorted implementations of the invention.

Furthermore, the described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor.

The code in which exemplary embodiments are implemented may further be accessible through a transmission media or from a file server over a network. In such cases, the article of manufacture in which the code is implemented may include a transmission media, such as a network transmission line, wireless transmission media, signals propagating through space, radio waves, infrared signals, etc. Of course, those skilled in the art will recognize that many modifications may be made to this configuration, and that the article of manufacture may comprise any information bearing medium known in the art.

The logic implementation shown in the figures describe specific operations as occurring in a particular order. In alternative implementations, certain logic operations may be performed in a different order, modified or removed and still implement certain embodiments of the present invention. Moreover, operations may be added to the above described logic and still conform to the described implementations.

Figure 6:
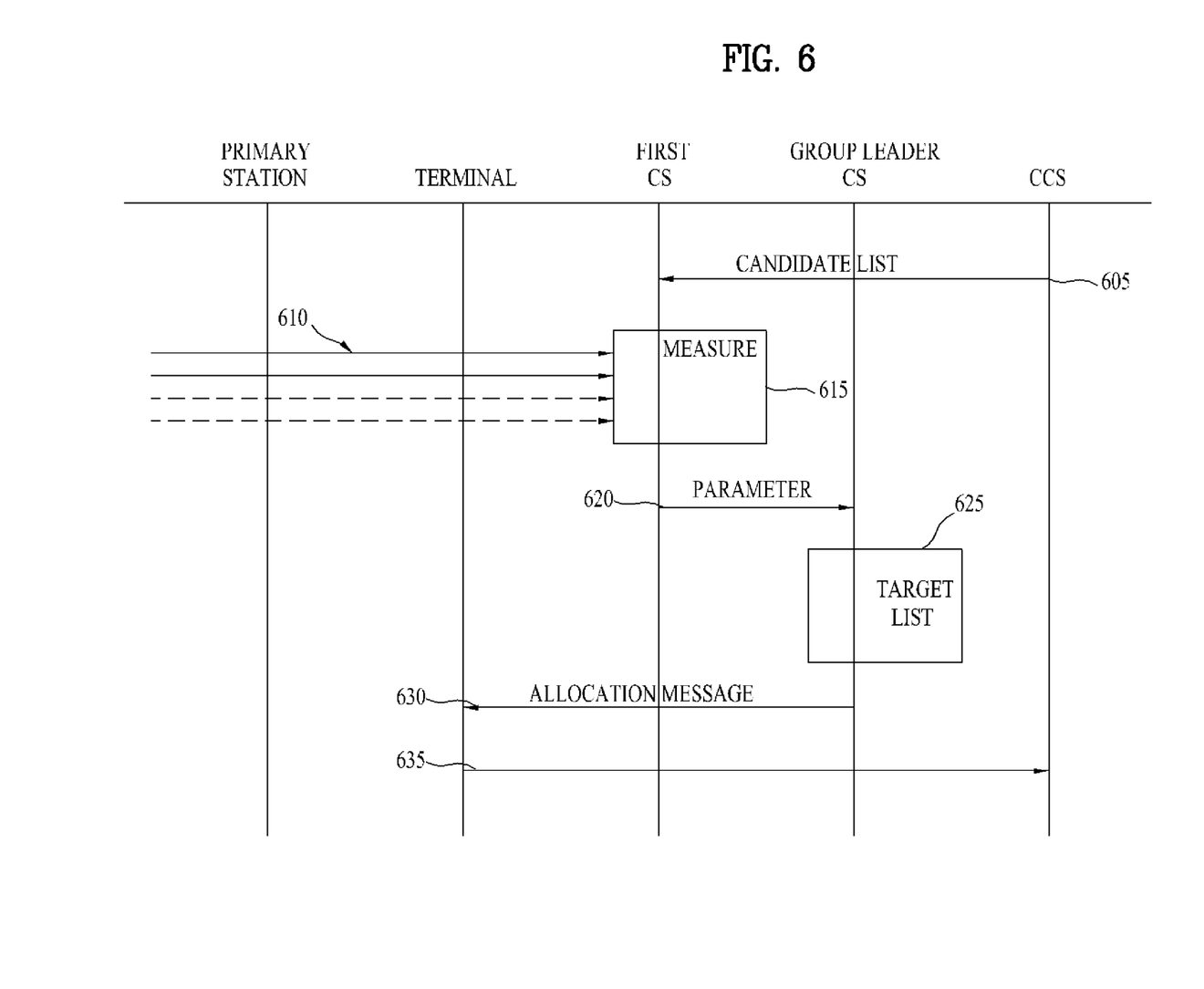
FIG. 6 is a diagram showing signal flow between various entities of a radio communications system in accordance with various embodiments of the present invention.

FIG. 6 is a diagram showing signal flow between various entities of a radio communications system in accordance with various embodiments of the present invention. The entities illustrated include the primary station, terminal, a first CS, a group leader CS, and a CCS. These entities are described in more detail above.

In accordance with some embodiments, radio communications may be facilitated by permitting wireless communication between the terminal and the CCS via any of a first group of frequencies. In general, at least one of the first group of frequencies is a frequency associated with the primary station that is in communication range of the terminal.

Operation 605 includes receiving, at a first CS from the CCS, a message having a candidate list of one or more candidate frequencies. Commonly, each frequency of the candidate list is a frequency at which each of the terminal, the CCS, and the primary station are configured to operate. The first CS and group leader are each usually one of a plurality of CSs.

Signals 610, each of differing frequency, are shown being received at the first CS. Such signals permit, for example, measuring of the availability of a frequency of the candidate list to form a first transmission parameter (operation 615)

Operation 620 includes sending from the first CS to the group leader CS, the first transmission parameter. Operation 625 relates to determining, based upon the transmission parameter received from the first CS, a target frequency list indicating which frequency or frequencies of the candidate list is available for communication between the terminal and the CCS.

Operation 630 include broadcasting or transmitting an allocation message identifying one or more frequencies of the target frequency list. At some point, the terminal transmits a communication to the CCS using a frequency of the target frequency list, as identified in the allocation message (operation 635).

The foregoing embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for facilitating radio communications, the method comprising:
    receiving, at a cognitive station (CS) from a cognitive central station (CCS), a message comprising a candidate list of one or more candidate frequencies and information which indicates that the CS is designated as a group leader of a CS group, wherein each frequency of the candidate list is a frequency at which each of a terminal, the CCS, and a primary station in communication range of the terminal is configured to operate;
    receiving, at the CS, a transmission parameter from each CS of the CS group;
    determining, at the CS, based upon the transmission parameter a target frequency list indicating which frequency or frequencies of the candidate list is available for communication between the terminal and the CCS; and
    providing, to the terminal, an allocation message identifying one or more frequencies of the target frequency list at which the terminal is permitted to communicate with the CCS.

2. The method of claim 1, wherein the allocation message is provided to the terminal by broadcasting at the CS.

3. The method of claim 2, further comprising:
    determining a power level for performing the broadcasting of the allocation message based upon a measured interference level, a geographical location of the primary station and a geographical location of the CCS; and
    broadcasting the allocation message at the determined power level.

4. The method of claim 1, wherein the transmission parameter indicates whether or not each frequency of the candidate list is available.

5. The method of claim 1, wherein the candidate list comprises a plurality of candidate frequencies.

6. The method of claim 1, wherein the CS group comprises a first CS group comprising at least one CS and wherein a second CS group comprises at least one CS, the method further comprising:

measuring, at each CS of the first CS group, availability of a first set of frequencies of the candidate list to form a first transmission parameter;

measuring, at each CS of the second CS group, availability of a second set of frequencies of the candidate list to form a second transmission parameter, wherein the first set of frequencies is different from the second set of frequencies;

receiving, at the CS designated as the group leader, the first transmission parameter from each CS of the first CS group;

receiving, at the CS designated as the group leader, the second transmission parameter from each CS of the second CS group; and determining, at the CS designated as the group leader, based upon either or both of the first and second transmission parameters, the target frequency list indicating which frequency or frequencies of the candidate list is available for communication between the terminal and the CCS.

7. The method of claim 1, wherein the message from the CCS further comprises a geographical location of the CCS and a geographical location of the primary station, the method further comprising:

determining, at the terminal, a communication transmission power level based on a measured interference level, the geographical location of the CCS and the geographical location of the primary station; and transmitting the communication to the CCS using the determined communication transmission power level.

8. The method of claim 7, wherein the transmitting comprises:

transmitting the communication from the terminal to the CS;

receiving the communication at the CS; and relaying the communication from the CS to the CCS.

9. The method of claim 7, wherein the transmitting the communication to the CS using the frequency of the target frequency list occurs until the primary station needs the frequency of the target frequency list for use.

10. The method of claim 7, wherein the allocation message indicates that a particular frequency of the target frequency list is to be used for the transmitting the communication only within a defined power threshold.

11. The method of claim 7, wherein the terminal performs the transmitting of the communication to the CCS using a defined coding, modulation, and transmission power, wherein at least the coding, the modulation, or the transmission power is determined based upon data in the allocation message.

12. The method of claim 1, wherein the primary station comprises a mobile terminal, a wireless transmitter, a base station, a NodeB, an eNodeB, or an access point.

13. The method of claim 1, wherein the CS designated as the group leader is configured to measure frequency characteristics of the frequencies of the candidate list over a given frequency spectrum.

14. The method of claim 1, wherein the CCS comprises a mobile terminal, a wireless transmitter, a base station, a NodeB, an eNodeB, or an access point.

15. The method of claim 1, wherein the CCS is collocated with the primary station.

16. The method of claim 1, wherein the CS and the CCS are fixed stations.

17. The method of claim 1, wherein the transmission parameter comprises measurement data associated with each frequency of the candidate list.

18. An apparatus for facilitating radio communications, the apparatus comprising:

a receiver configured to receive from a cognitive central station (CCS), a message comprising a candidate list of one or more candidate frequencies and information which indicates that the apparatus is designated as a group leader of a CS group, wherein each frequency of the candidate list is a frequency at which each of a terminal, the CCS, and a primary station in communication range of the terminal is configured to operate;

a transmitter configured to provide to the terminal, an allocation message identifying one or more frequencies of a target frequency list at which the terminal is permitted to communicate with the CCS; and a processor configured to:

receive a transmission parameter from each CS of the CS group; and determine based upon the transmission parameter the target frequency list indicating which frequency or frequencies of the candidate list is available for communication between the terminal and the CCS.

19. The method of claim 1, further comprising:

permitting wireless communication between the terminal and the CCS via any of a set of frequencies, wherein at least one of the set of frequencies is a frequency associated with a primary station that is in communication range of the terminal.

* * * * *